Nov. 6, 1951 M. C. TEAGUE 2,574,200
METHOD OF MAKING STRETCHABLE WOVEN FABRICS
Filed May 23, 1950 2 SHEETS—SHEET 2
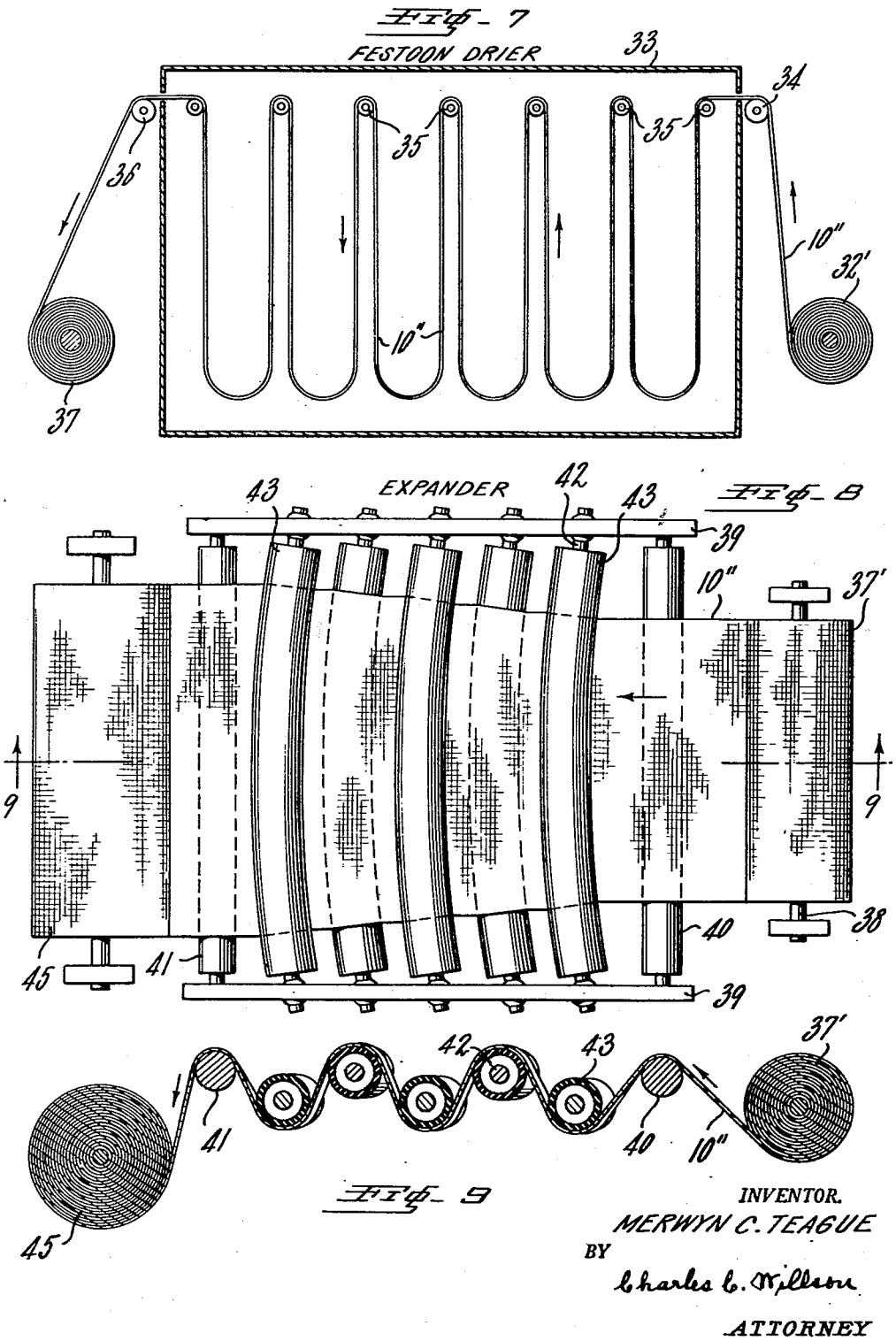
INVENTOR.
MERWYN C. TEAGUE
BY
Charles C. Willson
ATTORNEY Patented Nov. 6, 1951

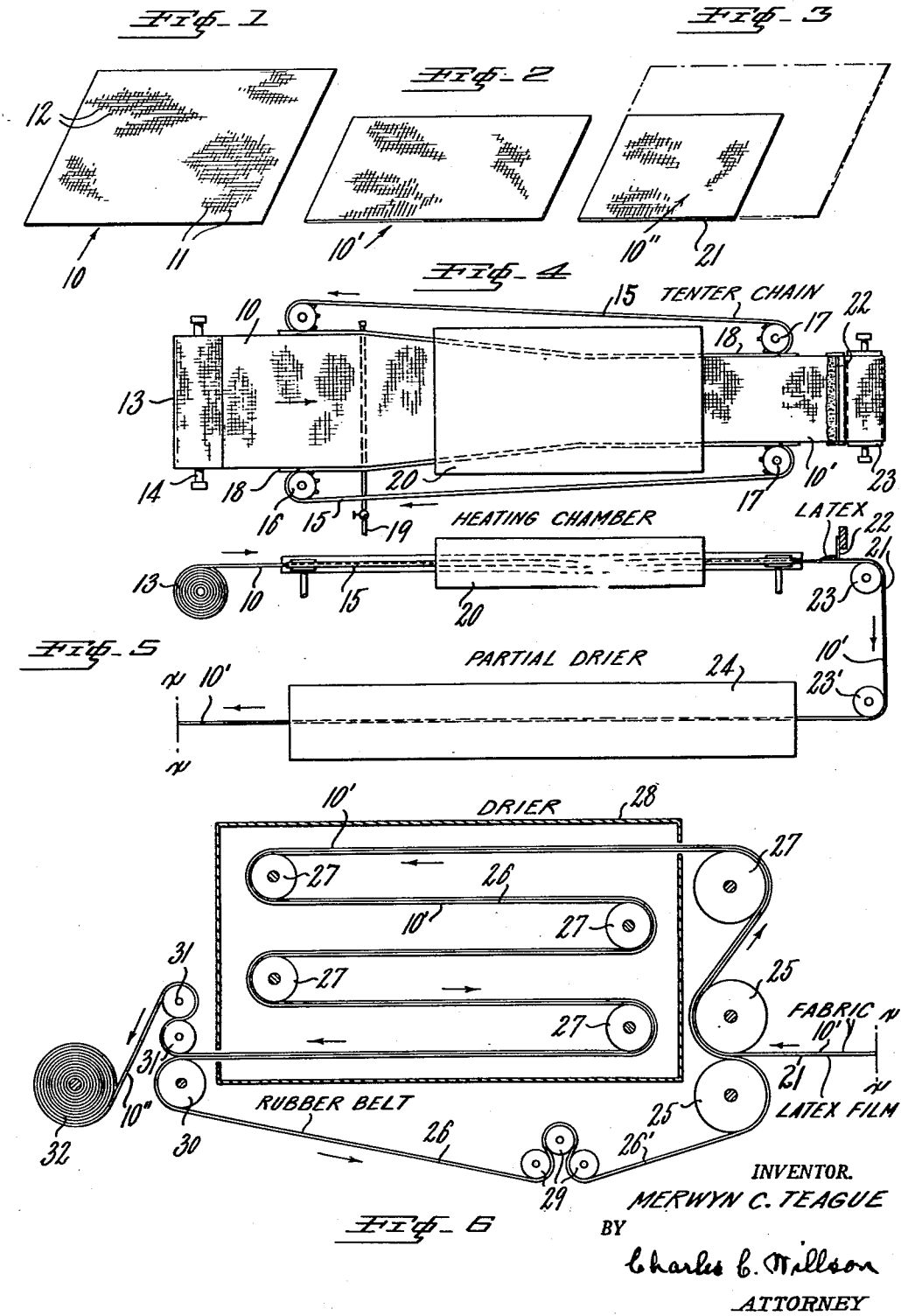

2,574,200

UNITED STATES PATENT OFFICE 2,574,200

METHOD OF MAKING STRETCHABLE WOVEN FABRICS

Merwyn C. Teague, Sparta, N. J., assignor to United States Rubber Company, New York, N. Y., a corporation of New Jersey Application May 23, 1950, Serial No. 163,729

9 Claims. (Cl. 28—74)

This invention relates to a method of making two-way stretch fabrics having a substantial amount of stretch both longitudinally and transversely, and formed of a non-elastic woven fabric having a rubber backing secured thereto.

Two-way stretch woven fabrics employing rubber threads in the warp and weft to impart the desired stretch thereto are old, and woven textile fabrics have been made stretchable heretofore to some degree by condensing the fabric and applying a rubber backing to the condensed fabric, so that it will stretch a short amount and then contract under the influence of the rubber backing.

It may be desirable in many cases to provide a two-way stretch woven rubber-backed fabric having a substantial and predetermined amount of stretch both longitudinally and transversely, and this invention contemplates a good practical method for providing a strong, durable, woven fabric having these properties.

The present invention contemplates a simple and practical method for imparting to a woven textile fabric a substantial and predetermined amount of stretch, up to 50% or more both longitudinally and transversely, to thereby provide a two-way stretch woven fabric having the appearance, wearing properties and feel of any desired woven all textile fabric, but which is capable of stretching both longitudinally and transversely anywhere from 10 to 50% or more.

Such a fabric may be woven of cotton, rayon, wool, nylon or other yarns, and may have any desired design woven in the fabric or printed thereupon. The fabric may be woven with a smooth or pile face, and the weave used may be plain, twill, satin or other well known or desired weave. If a substantial amount of stretch is desired in the fabric, then it should be formed with a relatively open weave, since in order to impart a substantial amount of stretch to the fabric it must be condensed a substantial amount, and a closely woven fabric cannot be condensed more than a small amount. The two-way stretch fabric contemplated by the present invention may be used for a number of purposes and is well adapted for use as upholstery material and particularly as a yielding cover for seat cushions.

In order to impart a substantial amount of stretch to a woven textile fabric, such as herein contemplated, it is necessary to shrink or condense such fabric a substantial amount, and to provide the condensed fabric with a rubber backing that will normally hold the fabric in the condensed condition. In such a fabric the original weave will serve to limit the stretch of the same. One important feature of the present invention resides in the method of contracting a woven all textile fabric a substantial amount both longitudinally and transversely. Another important feature resides in a method of contracting such fabric a predetermined and accurately controlled amount, so as to provide a fabric having a predetermined and uniform amount of stretch both longitudinally and transversely. Still another important feature of the present invention resides in a method whereby such longitudinal and transverse stretch can be imparted to the fabric as a continuous operation as the fabric moves in the direction of its length through the successive treating stages.

The all textile fabric, in accordance with the present invention, is woven with heat-shrinkable yarns in the weft so that upon the application of heat these yarns will contract or shrink the fabric a substantial amount transversely. This transversely shrunken fabric then has a film of tacky rubber applied to one face thereof, and this tacky film is empoyed to bond the fabric to a moving and longitudinally stretched belt, so that when the longitudinal tension upon this belt is reduced it will contract and condense the fabric longitudinally a predetermined amount. The rubber film while adhered to the belt is dried sufficiently to cause it to hold the fabric condensed longitudinally, the shrunken weft yarns will hold it contracted transversely. The coated and condensed fabric is removed from the rubber belt and cured to provide the desired two-way stretch woven fabric.

The above and other features of the present invention will be further understood from the following description when read in connection with the accompanying drawings illustrating a two-way stretch woven fabric, and one good practical form of apparatus for carrying out the present method.

In the drawings:

Fig. 1 is a plan view of a piece of woven fabric having an open weave and containing heat shrinkable yarns in the weft.

Fig. 2 is a plan view showing the fabric of Fig. 1 after it has been heated and shrunken transversely a predetermined amount.

Fig. 3 is a plan view of the finished elastic fabric, and shows the fabric of Fig. 1 after it has been treated in accordance with the present method and made stretchable approximately 50% longitudinally and transversely to the dot and dash line position shown in this figure.

Fig. 4 is a more or less diagrammatic plan view of apparatus for treating the fabric of Fig. 1 to shrink it transversely a predetermined amount so as to form the fabric of Fig. 2.

Fig. 5 is a side view of the apparatus of Fig. 4.

Fig. 6 is a side view with parts in section of a continuation of the apparatus of Fig. 5, whereby the transversely shrunken fabric of Fig. 5 is longitudinally condensed by the apparatus of Fig. 6.

Fig. 7 is a side view with parts in section of a festoon dryer employed to cure or vulcanize the fabric when it leaves the apparatus of Fig. 6.

Fig. 8 is a top plan view of an expander or spreader employed to forcibly stretch transversely the fabric received from the apparatus of Fig. 7; and Fig. 9 is a sectional view taken on the line 9—9 of Fig. 8.

Now referring to the drawings, the fabric designated by 10 and shown in Fig. 1 is a non-elastic all textile fabric formed of the warp threads 11 and weft threads 12. This fabric 10, as above stated, may be formed of various types of yarns and may be given any one of many weaves to impart to the fabric, the desired appearance, feel and wearing properties. This fabric should be given a relatively open weave so that it may be condensed a substantial amount, and it should be provided with sufficient heat-shrinkable yarns in the weft to contract the fabric a substantial amount under the application of heat. The heat-shrinkable yarns may be formed as disclosed in the Foster Patent No. 2,450,948 and embodied in the fabric to extend weft-wise therein as disclosed in such patent. It is preferable however that the heat shrinkable yarns be constructed as disclosed in the Foster application Serial No. 140,478, filed January 25, 1950 and which yarns are made shrinkable by mixing with non-continuous fibers such as cotton from 10 to 40% of cut heat shrinkable filaments having about the same length as the cotton fibers. Such intermixed fibers and cut filaments are formed into a yarn that will shrink a substantial amount upon the application of heat. These heat shrinkable yarns are then introduced as weft 12 in the fabric 10. All of the wefts 12 may have this heat shrinkable property or only sufficient wefts need have this property as are needed to shrink the fabric 10 width-wise the desired amount to thereby reduce its width from that indicated by 10 in Fig. 1 to that indicated by 10' in Fig. 2.

The fabric 10 constructed as just described so that it will shrink transversely upon the application of heat is shown in Figs. 4 and 5 as wound upon a roll 13 which is rotatably supported by a shaft 14 so that it may be unwound from this roll and advanced in a horizontal direction as indicated by the arrow in Fig. 4. While traveling in this direction the fabric is subjected to sufficient heat to cause the heat shrinkable yarns in the weft to contract or condense the fabric transversely. It is difficult to so construct the fabric 10 that it will contract the same amount throughout its length upon the application of heat. Therefore in order to control accurately the contraction of such fabric upon the application of heat it is desired to provide means for mechanically limiting the amount the fabric is permitted to shrink under the application of heat.

This is preferably accomplished by using tentering chains of well known construction and which may comprise the endless chains 15 which pass around the sprocket wheels 16 and 17 at the end of the chain runs and one run of each chain is guided by a track 18. These tracks converge towards each other an appreciable amount in the direction in which the fabric travels as shown in the drawing. These tentering chains may be provided with pins which engage the selvage edges of the fabric 10 or they may be provided with clamping jaws, of well known construction, which operate to engage the selvage edges of the fabric and thereby limit the contraction of the fabric as the inner runs of the chains 15 travel along the path defined by the tracks 18. This limits to a definite amount the shrinkage of the fabric 10 by the contraction of the heat shrinkable yarns under the application of heat.

Various means may be employed to heat the fabric 10 and thereby cause it to shrink transversely, and it may be shrunken in a wet or dry condition. In the construction shown it is initially heated and moistened by means of the steam pipe 19 which extends transversely of the fabric and is provided with a number of small apertures through which wet steam issuing from the pipe will strike the fabric to moisten and heat it. This fabric may be further heated by causing it with the tentering chains to pass through a heating chamber 20, which may be heated by steam coils or other suitable means. By employing the construction just described the shrinkage of the fabric 10 under the application of heat is mechanically limited to insure that the shrinkage will be accurately controlled throughout the length of the fabric. The tentering chains 15 may be driven by any suitable means to advance the fabric in the direction indicated by the arrow, and after the fabric has been shrunken transversely the desired amount, to reduce its width from that shown in Fig. 1 to that shown in Fig. 2, a film of tacky rubber, such as solvent rubber but preferably natural or synthetic latex rubber may be applied thereto as will now be described.

It is desired to mention that the heat shrinkable yarns above mentioned will serve not only to shrink the fabric transversely from the width indicated by 10 in Fig. 4 to the narrow width indicated by 10' of this figure, but will serve also to lock the fabric in its shrunken condition and hold it in this narrow shrunken condition. As the shrunken fabric 10' leaves the tentering mechanism just described it preferably has a film of tacky rubber applied to one face thereof. This film indicated by 21 may be applied in a well known manner as by spraying, rolling or spreading on the fabric. It is shown in Figs. 4 and 5 as applied by means of a spreader 22 which serves to spread a bank of latex smoothly over the face of the fabric 10' as this fabric approaches a supporting roll 23. As soon as this fabric is coated with latex as just described it may pass around this supporting and guiding roll 23 and then downwardly and around a lower guiding roll 23', to pass around the roll 23' in a reverse direction as shown in Fig. 5, so as to pass this freshly coated fabric through the partial dryer 24 to dry the rubber coating 21 sufficiently to prevent it from flowing but enough to cause it to be highly tacky.

Upon leaving the partial dryer 24 this fabric is ready to be condensed longitudinally, and in order to condense this travelling fabric longitudinally an accurate predetermined amount, it is preferable to use the longitudinal condensing means shown in Fig. 6, which view forms a continuation of Fig. 5, the line $x$—$x$ in these two figures indicates where the fabric of Fig. 5 should join that of Fig. 6. It will be noted that as the latex coated fabric passes through the partial dryer 24 its tacky film 21 faces downwardly. This is indicated by the legends "Fabric" and "Latex film" in Fig. 6.

In order to condense this fabric 10' longitudinally an accurate amount, it is advanced as shown in Fig. 6 between the nip of a pair of rolls 25 where it is brought into contact with an endless rubber belt 26 that passes around the various guide rolls 27 most of which are located in the dryer 28. The belt 26 is preferably a relatively thick rubber belt having good elastic properties and good fatigue resisting properties. A short length 26' of this belt, namely that extending between the cooperating gripping rolls 29 and the nip of the rolls 25 is highly stretched, so that as the coated fabric 10' contacts this highly stretched portion of the belt it will be secured thereto by its tacky film 21, and as this belt 26 passes upwardly around the upper roll 25 and about the supporting rolls 27 it is relaxed a predetermined amount to thereby condense the fabric secured thereto just the desired amount. The relaxed portion 26 of this belt with the fabric secured thereto passes back and forth within the dryer 28 as shown so as to dry the latex film sufficiently to render it substantially non-tacky. It is then preferably stripped from the rubber belt 26 as a run of this belt passes downwardly about a roller 30 while the coated fabric, which is now condensed both longitudinally and transversely, is stripped from the belt and passes upwardly around the rollers 31 and is wound onto a take-up roll 32. The coated face preferably is at this time sufficiently dry to prevent the successive coils on the roll 32 from adhering one to another.

While the coated fabric of the roll 32 of Fig. 6 is no longer tacky, it may be necessary to further heat treat the same to cure or vulcanize the rubber film 21 secured thereto. Various heating means may be used for this purpose. One good practical construction resides in the festoon dryer 33 shown in Fig. 7, which dryer may be of usual construction and operates in the usual manner. As here shown the roll 32 of Fig. 6 may be transferred to the position indicated by 32' in Fig. 7 where it is rotatably supported so that the fabric may be unwound therefrom and passed around a roll 34 outside of the dryer and then around the various festoon supporting rolls 35 within the dryer. Upon leaving this festoon dryer the vulcanized rubber-backed fabric may pass around a roll 36 whereupon the stretchable fabric is wound upon the take-up roll 37.

This completes the operation of producing the two-way stretch rubber-backed woven fabric contemplated by the present invention, except that the heat shrinkable yarns provided to contract the fabric 10 transversely, serve as above stated, to lock the fabric in its transversely contracted condition and will prevent it from stretching laterally, unless such heat shrunken yarns are rendered inactive. The heat used to cure or vulcanize the rubber backing 11 may in some cases be sufficient to render the heat shrunken yarns inactive to hold the fabric shrunken weft-wise, but should the vulcanizing heat not serve this added purpose, it may be desirable to mechanically stretch the fabric transversely with sufficient force to stretch or break the holding filaments or rearrange the cut shrinkable staples in the heat shrunken weft yarns and release the fabric from the holding action of such shrunken weft yarns. One good practical means for so stretching the fabric transversely is shown in Figs. 8 and 9 and will now be described.

The fabric roll 37 of Fig. 7 is transferred to the position indicated by 37' in Figs. 8 and 9 where it is supported by a shaft 38 so that the fabric 10" may be unwound from the roll as it is advanced in the direction indicated by the arrows in Figs. 8 and 9 through a spreading machine of well known construction and called an "expander." This expander consists of the side supporting frames 39 that support adjacent one end thereof an ordinary roller 40 and at the other end thereof an ordinary roller 41. Between these rollers 40 and 41 are provided a number of specially constructed expander rolls each comprising a curved solid shaft 42 which is rigidly supported in the desired position by the side frames 39. Upon each fixed shaft 42 is rotatably mounted a relatively long flexible tube 43 such as a neoprene tube. This tube has mounted therein at spaced points supporting elements that rotate by means of ball bearings on the shaft 42. The arrangement is such that these expander rolls are supported in a staggered path between the ordinary rolls 40 and 41 and the coated fabric 10" is laced over one of these rolls and under the other as shown in Figs. 8 and 9. Since these expander rolls are curved lengthwise in the form of an arc the neoprene rubber tube 43 of each roll as it rotates will be compressed longitudinally at the concave outer surface of such roll and extended longitudinally at the convex outer surface of the same roll. As the coated fabric 10" is pulled forward it will travel in a serpentine path about these curve rolls as best shown in Fig. 9. The advancing fabric will rotate the sleeves 43 on the shafts 42 and this will serve to stretch the fabric width-wise in increasing amounts as it advances from one of these rolls to another, until its width is increased from that of the roll 37' to that shown adjacent the roll 41. It is then wound upon the take-up roll 45 which contains the finished two-way stretch fabric. Since the fabric wound on the roll 45 is stretched laterally, it may be desirable to rewind it so that it will be free of tension and thereby provide the relaxed fabric 10" of Fig. 3 which will stretch both longitudinally and transversely to the much larger area indicated by the dot and dash line of this figure. Such dot and dash lines correspond to the original dimensions of the fabric shown in Fig. 1. When the fabric 10" of Fig. 3 is free from tension it will be held contracted to the area shown, by the rubber backing film 21.

It will be understood from the foregoing that in order to carry out the method of the present invention it is necessary to employ heat shrinkable yarns to form at least some of the weft yarns 12 of the fabric 10 shown in Fig. 1. These heat shrinkable yarns may be somewhat more expensive than ordinary yarns such as cotton or rayon, but it is desired to mention however that the present method makes it unnecessary to employ heat shrinkable yarns in both the warp and weft, since by employing the present method the fabric is condensed longitudinally any desired amount by the contraction of the condensing belt 26. It will also be understood that by using the tentering means above described to mechanically limit the amount the fabric is permitted to shrink transversely, and by accurately controlling the amount the belt 26 is allowed to contract longitudinally while the fabric is bonded thereto, the stretch characteristics imparted to the fabric both longitudinally and transversely can be accurately controlled. Furthermore the method of the present invention is carried out as a continuous operation which reduces the cost of treating the fabric in accordance with the present method, to provide a two-way stretch rubber-backed woven fabric capable of stretch both longitudinally and transversely as much as 50% or more.

Having thus described my invention, what I claim and desire to protect by Letters Patent is:

1. The method of making a two-way stretch fabric formed of a non-elastic woven sheet having a rubber backing secured thereto, which comprises weaving in the fabric heat-shrinkable weft yarns, heating the fabric so as to cause these yarns to contract the fabric weft-wise, applying a film of tacky rubber to one face of the shrunken fabric and employing this tacky film to bond the fabric to a longitudinally stretched rubber belt, then allowing this belt to contract to shrink the fabric warp wise, heating the transversely and longitudinally contracted fabric to dry the tacky film, and removing this fabric from the rubber belt.

2. The method of making a two-way stretch fabric formed of a non-elastic woven sheet having a rubber backing secured thereto, which comprises weaving in the fabric heat-shrinkable weft yarns, heating the fabric so as to cause these yarns to contract the fabric weft-wise and mechanically limiting the amount of this shrinkage, applying a film of tacky rubber to one face of the shrunken fabric and employing this tacky film to bond the fabric to a longitudinally stretched rubber belt, then allowing this belt to contract to shrink the fabric warp-wise, heating the transversely and longitudinally contracted fabric to dry the tacky film, and removing this fabric from the rubber belt.

3. The method of making a two-way stretch fabric formed of a non-elastic woven sheet having a rubber backing secured thereto, which comprises weaving in the fabric heat shrinkable weft yarns, heating the fabric so as to cause these yarns to contract the fabric weft-wise and lock the fabric in its shrunken condition, applying a film of tacky rubber to one face of the shrunken fabric and employing this tacky film to bond this fabric to a longitudinally stretched rubber belt, allowing this belt to contract to shrink the fabric warp-wise, heating the transversely and longitudinally contracted fabric to dry the tacky film, removing this fabric from the rubber belt, and rendering said heat shrunken yarns inactive to hold the fabric shrunken weft-wise.

4. The method of making a two-way stretch fabric formed of a non-elastic woven sheet having a rubber backing secured thereto, which comprises weaving in the fabric heat-shrinkable weft yarns, heating the fabric so as to cause these yarns to contract the fabric weft-wise and hold it locked in this contracted condition and mechanically limiting the amount the fabric is permitted to contract, applying a film of tacky rubber to one face of the shrunken fabric and employing this tacky film to bond the weft-wise shrunken fabric to a longitudinally stretched rubber belt, allowing this belt to contract to shrink the fabric warpwise, heating the transversely and longitudinally contracted fabric to dry the tacky film, and removing this fabric from the rubber belt.

5. The method of making a two-way stretch fabric formed of a non-elastic woven sheet having a rubber backing secured thereto, which comprises weaving in the fabric heat-shrinkable weft yarns, heating the fabric so as to cause these yarns to contract the fabric at least 20% weft-wise, applying a film of tacky rubber to one face of the fabric and employing this tacky film to bond the fabric to a longitudinally stretched rubber belt, then allowing this belt to contract and condense the fabric warp-wise at least 20%, heating the transversely and longitudinally contracted fabric to dry the tacky film, and removing this fabric from the rubber belt.

6. The method of making a two-way stretch fabric formed of a non-elastic woven web having a rubber backing secured thereto, which comprises weaving in the fabric heat-shrinkable weft yarns, heating the fabric so as to cause these yarns to contract the fabric weft-wise, applying a film of tacky rubber to one face of the shrunken fabric and employing this film to bond the fabric to a longitudinally stretched rubber sheet, then allowing this rubber sheet to contract and condense the fabric warp-wise, heating the transversely and longitudinally condensed fabric to cure the rubber film secured thereto, and rendering the heat shunken yarns inactive to hold the fabric shunken weft-wise.

7. The method of making a two-way stretch fabric formed of a non-elastic woven sheet having a rubber backing secured thereto, which comprises weaving in the fabric heat shrinkable weft yarns, heating this fabric so as to cause these yarns to contract the fabric weft-wise, applying a film of tacky rubber to one face of the shrunken fabric and employing this tacky film to bond the fabric to a travelling longitudinally stretched belt, permitting such travelling belt to contract and thereby condense the fabric longitudinally, and then partly drying the rubber film and stripping this coated fabric from the contracted belt as it continues to travel.

8. The method of making a two-way stretch fabric formed of a non-elastic woven sheet having a rubber backing secured thereto, which comprises weaving in the fabric heat shrinkable weft yarns, heating this fabric so as to cause these yarns to contract the fabric weft-wise, applying a film of tacky rubber to one face of the shrunken fabric and employing this tacky film to bond the fabric to a travelling longitudinally stretched belt, permitting such travelling belt to contract and thereby condense the fabric longitudinally, and then curing the rubber film secured to this fabric so that this film will normally hold the fabric contracted warp-wise and weft-wise.

9. The method of making a two-way stretch fabric formed of a non-elastic woven sheet having a rubber backing secured thereto, which comprises weaving in the fabric heat-shrinkable weft yarns, heating the fabric to cause such yarns to contract the fabric to about $\frac{2}{3}$ of its previous width, applying a film of tacky rubber to one face of the shrunken fabric and employing this tacky film to bond the fabric to a longitudinally stretched travelling rubber belt, allowing this travelling belt to contract and thereby condense the fabric to about $\frac{2}{3}$ of its previous length, and then drying the rubber film and stripping this coated fabric from the contracted belt.

MERWYN C. TEAGUE.

REFERENCES CITED

The following references are of record in the file of this patent:

UNITED STATES PATENTS

| Number | Name | Date |
|---|---|---|
| 2,084,367 | Woodhead | June 22, 1937 |
| 2,444,903 | Van Buren | July 6, 1948 |
| 2,451,597 | Wheeler | Oct. 19, 1948 |
| 2,520,699 | Sowerby et al. | Aug. 29, 1950 |